(12) United States Patent
Kim

(10) Patent No.: US 6,486,919 B1
(45) Date of Patent: Nov. 26, 2002

(54) APPARATUS AND METHOD FOR CORRECTING JITTER IN A TELEVISION SYSTEM

(75) Inventor: Jeong-cheol Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/344,602

(22) Filed: Jun. 25, 1999

(30) Foreign Application Priority Data

Nov. 30, 1998 (KR) ............................................. 98-51868

(51) Int. Cl.[7] ........................... H04N 7/00; H04N 11/00
(52) U.S. Cl. ...................................... 348/497; 348/540
(58) Field of Search ................................ 348/497, 510, 348/512, 516, 521, 524, 522, 531, 530, 536, 537, 540, 541; H04N 7/00, 11/00

(56) References Cited

U.S. PATENT DOCUMENTS 4,092,672 A * 5/1978 Aschwanden ............... 348/516
5,053,862 A * 10/1991 Phillips et al. ............... 348/505
5,155,595 A * 10/1992 Robison ...................... 348/500
5,185,603 A * 2/1993 Medin ......................... 345/213
5,206,726 A * 4/1993 Okuda ......................... 348/497
5,515,108 A * 5/1996 Kim ............................. 348/498

* cited by examiner

*Primary Examiner*—Michael H. Lee
(74) *Attorney, Agent, or Firm*—Mills & Onello LLP

(57) ABSTRACT

An apparatus and method for correcting jitter components of a television system which can be generated by an asynchronous signal applied externally as well as a truncation error are described. In the apparatus for correcting jitter of a television system having a horizontal driving signal generator for generating a horizontal driving signal in response to a system clock signal and a first synchronous signal, a first phase difference detector detects a first phase difference between the system clock signal and a second synchronous signal, the second synchronous signal being input from the outside of the television system, asynchronous with the system clock signal, and able to be set as the first synchronous signal. A jitter corrector corrects a jitter component included in the horizontal driving signal in response to the first phase difference and outputting a horizontal driving signal the jitter component of which is corrected.

16 Claims, 6 Drawing Sheets

APPARATUS AND METHOD FOR CORRECTING JITTER IN A TELEVISION SYSTEM

BACKGROUND OF THE INVENTION

1. Field of the Invention

The present invention relates to a television system, and more particularly, to an apparatus and method for correcting jitter which can be generated by truncation during the processing of an internal signal and by asynchronization between the television system and an external system.

2. Description of the Related Art

The function of displaying an analog RGB video signal output from a computer on a cathode ray tube (CRT) using a television system is typically performed by a multimedia television. In such a system, there is a horizontal synchronous signal and a vertical synchronous signal in addition to the RGB video signal in the information transferred from the computer to the television system. These external horizontal synchronous and vertical synchronous signals are typically not synchronized with a system clock signal (CLK) used for the television system.

Jitter can be generated on the screen of the CRT by the external synchronous signals as described below with reference to the attached drawings. FIG. 1 contains four waveforms labelled (a) through (d) related to an Nth horizontal scan line of the CRT screen. Waveform (a) illustrates a horizontal synchronous signal in asynchronous relation with a system clock signal illustrated in waveform (c). Waveform (b) shows an RGB video signal. Waveform (d) shows a waveform of the horizontal synchronous signal synchronized with the system clock signal (CLK) of waveform (c).

The horizontal synchronous signal of waveform (a) and the RGB video signal of waveform (b) are applied from the computer to the television system with a time difference of $T_{d1}$ as shown. Then, when the horizontal synchronous signal of waveform (a) is synchronized the system clock signal (CLK) of waveform (c), the time difference between the horizontal synchronous signal and the RGB video signal changes from $T_{d1}$ to $T_{d2}$ as shown in waveform (d).

FIG. 2 contains four waveforms labelled (a) through (d) related to an (N+1)th horizontal scan line of the CRT screen. Waveform (a) shows the horizontal synchronous signal in asynchronous relation with the system clock signal (CLK) shown in waveform (c). Waveform (b) shows the waveform of the RGB video signal. Waveform (d) shows the horizontal synchronous signal synchronized with the system clock signal (CLK) of waveform (c).

In the (N+1)th horizontal scan line displayed on the CRT subsequent to the Nth horizontal scan line, the horizontal synchronous signal and the RGB video signal respectively shown in waveforms (a) and (b) are applied from the computer to the television system with a time difference of $T_{d3}$. Then, when the horizontal synchronous signal of waveform (a) is synchronized with the system clock signal (CLK) of waveform (c), the time difference between the horizontal synchronous signal and the RGB video signal changes from $T_{d3}$ to $T_{d4}$ as shown in waveform (d).

As mentioned above, the time difference between the horizontal synchronous signal and the RGB video signal changes whenever the horizontal synchronous signal is input from the personal computer to the television system. Therefore the time difference varies in every horizontal scan line, and, as a result, the image displayed on the CRT exhibits vertical jitter.

Also, in such a system, a digital phase difference and a digital interpolation value between a fly back pulse (FBP) and a horizontal driving signal are typically truncated in a signal processing process. Specifically, in the typical television system, only the upper bits of the digital interpolation value and the digital phase difference are used, and the lower bits are truncated. The resulting truncation error causes vertical jitter on the image displayed on the CRT. The jitter components deteriorate picture quality and can cause viewers' eyes to tire.

SUMMARY OF THE INVENTION

It is an object of the present invention to provide an apparatus for correcting jitter of a television system by which it is possible to correct jitter components which can be induced by a synchronous signal applied externally and by a truncation error in a television system.

It is another object of the present invention to provide a method for correcting jitter of a television system performed in the jitter correcting apparatus of the television system.

Accordingly, the invention is directed to an apparatus and method for correcting jitter of a television system. The television system includes a horizontal driving signal generator for generating a horizontal driving signal in response to a system clock signal and a first synchronous signal. In one embodiment, the invention includes a first phase difference detecting portion for detecting a first phase difference between the system clock signal and a second synchronous signal, the second synchronous signal being (i) an external input to the television system, (ii) asynchronous with the system clock signal, and (iii) able to be set as the first synchronous signal. A jitter correcting portion of the invention corrects a jitter component included in the horizontal driving signal in response to the first phase difference and outputs a horizontal driving signal with a corrected jitter component.

In accordance with the invention, a method for correcting jitter of a television system performed by the jitter correcting apparatus of the television system having a horizontal driving signal generator for generating a horizontal driving signal in response to a system clock signal and a first synchronous signal includes detecting a first phase difference between a second synchronous signal and the system clock signal, wherein the second synchronous signal is (i) asynchronous with the system clock signal and (ii) able to be set as the first synchronous signal. In accordance with the invention, the method also includes correcting the jitter component included in the horizontal driving signal, corresponding to the first phase difference.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF THE PREFERRED EMBODIMENTS

Figure 3:
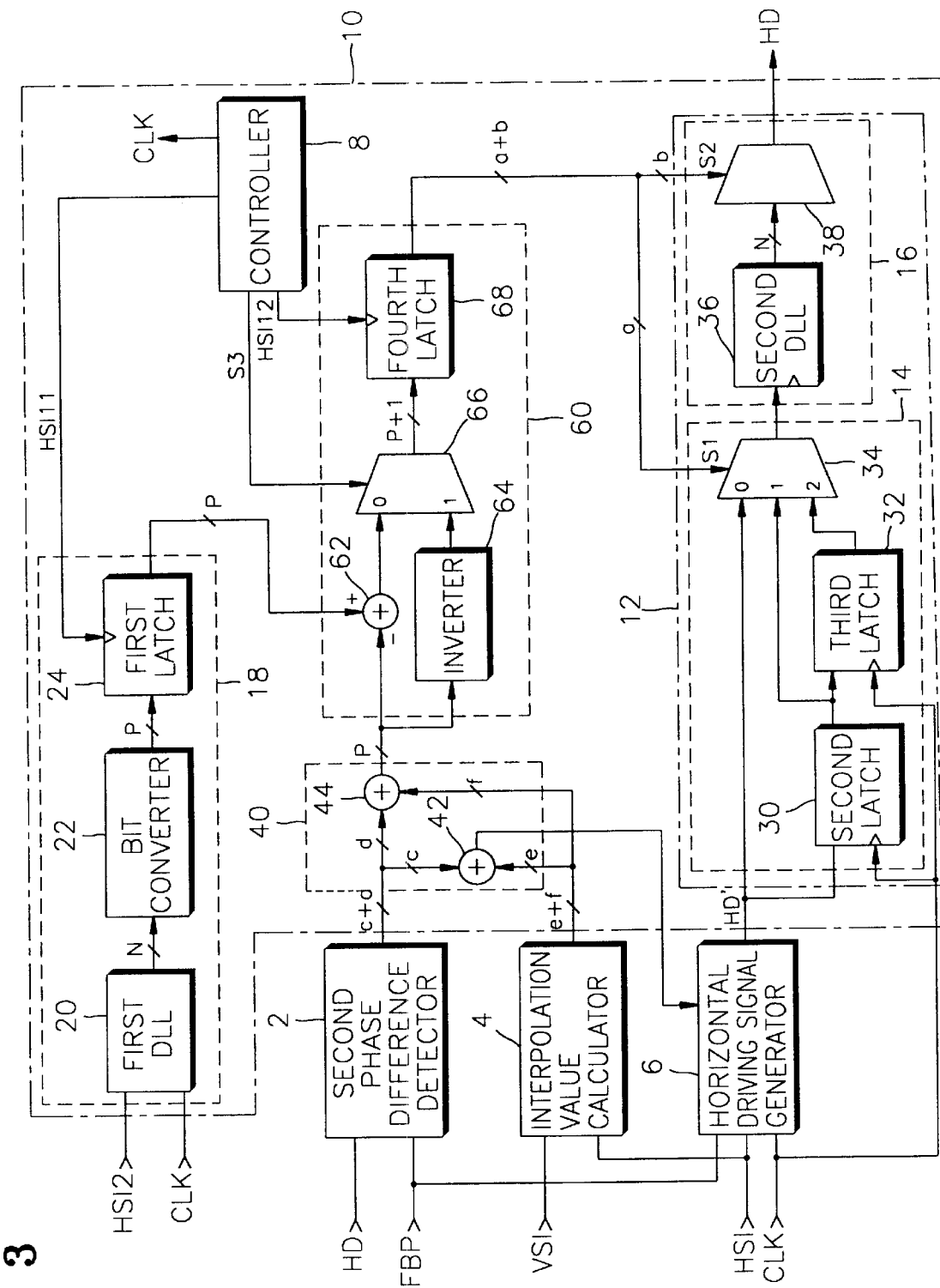
FIG. 3 is a block diagram of a television system having a jitter correcting apparatus in accordance with one embodiment of the present invention.

Hereinafter, the structure and the operation of a jitter correcting apparatus of a television system according to the present invention and a jitter correcting method will be described. FIG. 3 is a block diagram of a television system having a jitter correcting apparatus 10 according to an embodiment of the present invention. The television system includes a second phase difference detector 2, an interpolation value calculator 4, a horizontal driving signal generator 6, and a jitter correcting apparatus 10 according to the present invention.

The jitter correcting apparatus 10 shown in FIG. 3 includes a jitter corrector 12, which includes an integer corrector 14 and a decimal number corrector 16. A first phase difference detector 18 includes a first delay locked loop (DLL) 20, a bit converter 22, and a first latch 24. A truncation amount detector 40 includes adders 42 and 44. The jitter correcting apparatus 10 also includes a selection signal generator 60 and a controller 8. The integer corrector 14 includes second and third latches 30 and 32 and a multiplexer 34. The decimal number corrector 16 includes a second DLL 36 and a multiplexer 38. The selection signal generator 60 includes a subtracter 62, an inverter 64, a multiplexer 66, and a fourth latch 68.

Figure 4:
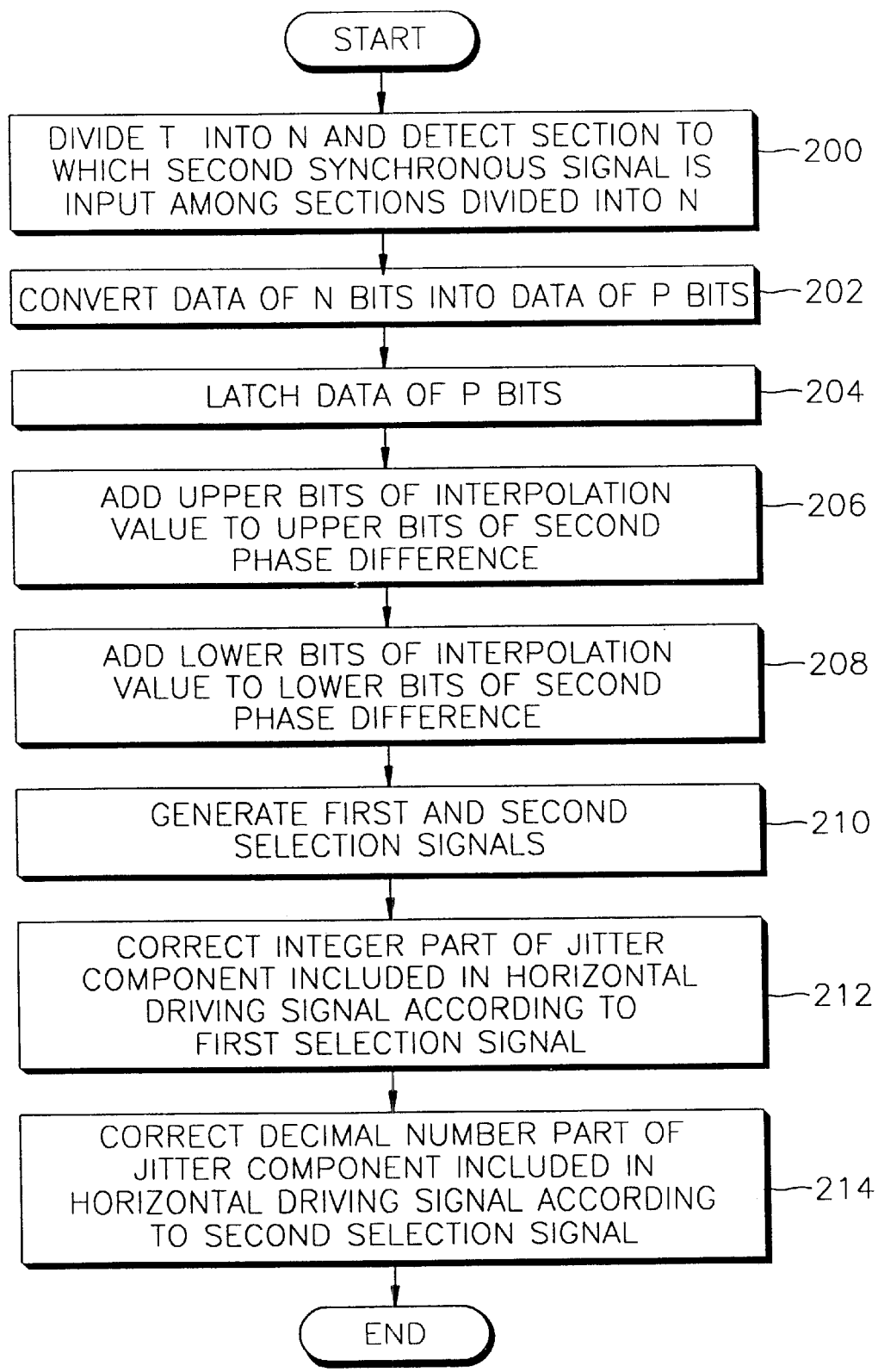
FIG. 4 is a flowchart for describing a jitter correcting method according to one embodiment of the present invention, which can be performed by the jitter correcting apparatus shown in FIG. 3.

FIG. 4 is a flowchart of a jitter correcting method according to the present invention, which can be performed by the jitter correcting apparatus 10 shown in FIG. 3. As shown in FIG. 4, in accordance with the method, a first phase difference is detected in steps 200 through 204. The truncation amount is detected in steps 206 through 208. First and second selection signals are generated in step 210, and jitter components included in the horizontal driving signal are corrected in steps 212 and 214.

In steps 200, 204 and 214, the jitter correcting apparatus 10 according to the present invention corrects the jitter components due to the first phase difference between a second horizontal synchronous signal HSI2 and a system clock signal CLK according to the following description. The horizontal driving signal generator 6 shown in FIG. 3 generates a horizontal driving signal HD' in response to the system clock signal CLK and a synchronous signal HSI. Here, the system clock signal CLK is output from the controller 8. The synchronous signal HSI can be a first synchronous signal HSI1, the second synchronous signal HSI2, or a third synchronous signal HSI3. At this time, when the second synchronous signal HSI2 is input to the first DLL 20, the synchronous signal HSI corresponds to the second synchronous signal HSI2. The horizontal synchronous signal included in the first or third synchronous signals HSI1 and HSI3 is synchronized with the system clock signal CLK. The first synchronous signal HSI1 can be the horizontal synchronous signal separated from a composite video baseband signal (CVBS) inside the television system. The third synchronous signal HSI3 can be the horizontal synchronous signal input with a digital video signal from the outside of the television system to the inside of the television system. The second synchronous signal HSI2 can be the horizontal synchronous signal input from, for example, a personal computer to the first DLL 20 and to the horizontal driving signal generator 6 without being synchronized with the system clock signal CLK.

First, the first phase difference detector 18 detects the phase difference between the second synchronous signal HSI2 and the system clock signal CLK and outputs the detected phase difference to the selection signal generator 60 as the first phase difference (steps 200 and 204). Here, the detected phase difference can be output to the jitter corrector 12, though not shown in FIG. 3. To achieve this, the first DLL 20 of the first phase difference detector 18 divides a unit period T of the system clock signal CLK by N, detects a section in which the second synchronous signal HSI2 is input among the sections divided by N, and outputs to the first latch 24 data of N bits corresponding to the detected section (step 200).

Figure 5:
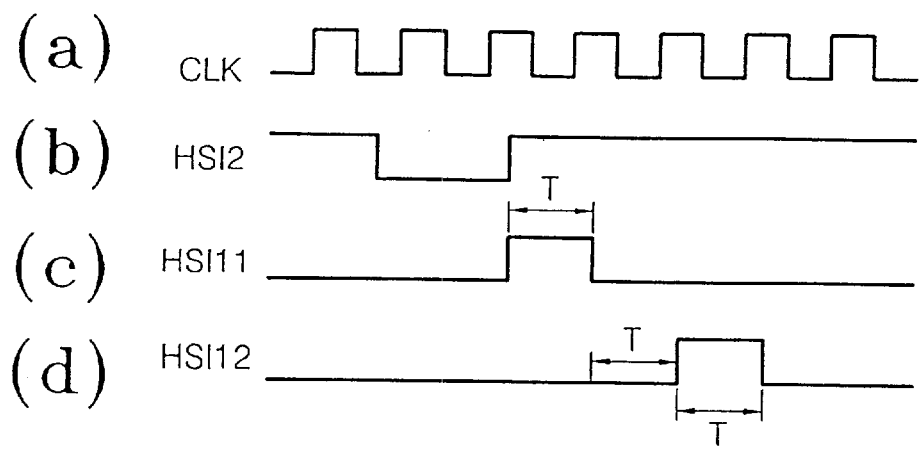
FIG. 5 contains four waveforms corresponding to elements shown in FIG. 3.

FIG. 5 shows four waveforms labelled (a) through (d) corresponding to elements shown in FIG. 3. Waveform (a) of FIG. 5 shows the waveform of the system clock signal CLK. Waveform (b) is the waveform of the second synchronous signal HSI2. Waveform (c) is the waveform of the first latch signal HSI11. Waveform (d) is the waveform of the second latch signal HSI12.

After step 200, the first latch 24 latches the data of N bits output from the first DLL 20 in response to the first latch signal HSI11 shown in waveform (c) and outputs the latched data of N bits to the jitter corrector 12 as the first phase difference (step 204). To achieve this, the controller 8 generates the first latch signal HSI11 shown in waveform (c), the edge of which rises at the rising edge of the second synchronous signal HSI2 shown in waveform (b) and falls after the unit period of the system clock signal CLK shown in waveform (a) from the point in time at which the edge rose.

After step 204, the jitter corrector 12 corrects the decimal number part of the jitter component included in the horizontal driving signal HD' output from the horizontal driving signal generator 6 in response to the lower bits of the first phase difference of N bits and outputs the corrected horizontal driving signal HD the jitter component of which is corrected (the step 214). To achieve this, the second DLL 36 of the decimal number corrector 16 divides one period 1 T into N, detects the section to which the horizontal driving signal HD' is input among the sections divided into N, and outputs data of N bits corresponding to the detected section to the multiplexer 38. At this time, the multiplexer 38 selects in response to lower bits S2 of the first phase difference one among the N bits of the data output from the second DLL 36 and outputs the selected bit as the result corrected by the decimal number corrector 16, i.e., the corrected horizontal driving signal HD the decimal number part of the jitter component of which is corrected.

Figure 1:
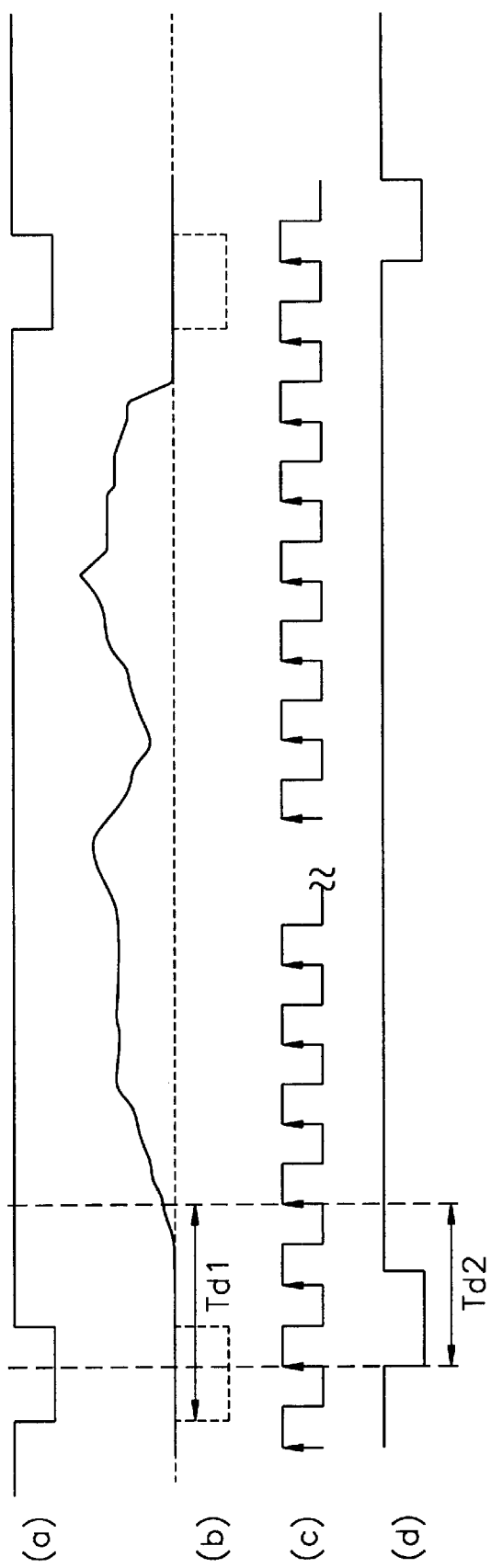
FIG. 1 contains four waveforms related to an Nth horizontal scan line of the screen of a cathode ray tube (CRT).
Figure 2:
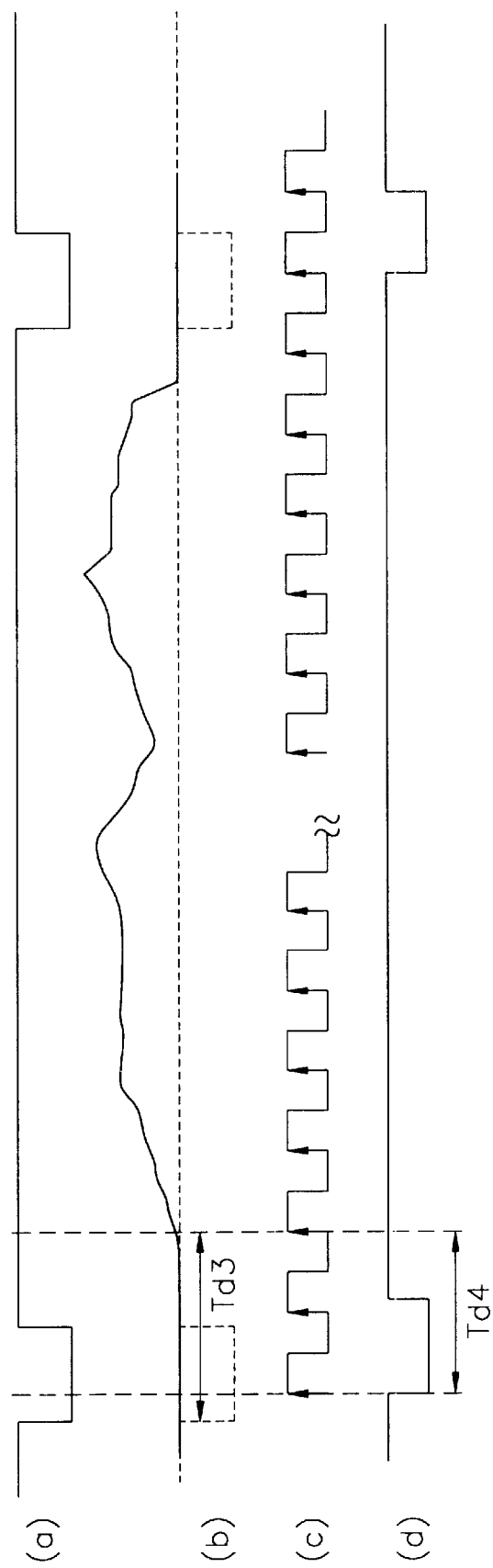
FIG. 2 contains four waveforms related to an (N+1)th horizontal scan line of the screen of a cathode ray tube.

For example, in the television system shown in FIG. 1, when the jitter component included in the horizontal driving signal HD' is 0.5 T, i.e., when the decimal number part of the jitter component is 0.5 T, the decimal number corrector 16 corrects 0.5 T by operating as mentioned above.

Thus far, the structure and the operation of the jitter correcting apparatus 10 for correcting the jitter component of the horizontal driving signal HD' by the first phase difference between the second synchronous signal HSI2 and the system clock signal CLK have been described. However, the entire jitter component included in the horizontal driving signal HD' is not caused by the first phase difference as mentioned above. Namely, since only upper bits c and e of the values output from the second phase difference detector 2 and the interpolation value calculator 4 are used and lower bits d and f are truncated, the jitter component due to the truncation error generated by the truncated bits d and f can be included in the horizontal driving signal HD'.

Hereinafter, the operation of the jitter correcting apparatus 10 shown in FIG. 3 for correcting the jitter component by the truncation error will be described with reference to steps 202 and 206 through 212 in FIG. 4. The second phase difference detector 2 shown in FIG. 3 detects a phase difference between the corrected horizontal driving signal HD the jitter component of which is corrected by the jitter corrector 12 and a flyback pulse (FBP), and outputs the detected phase difference of (c+d) bits to the adders 42 and 44 as a second phase difference. At this time, the number of bits (c+d) is determined so as to minimize the error of the operation performed inside the second phase difference detector 2. The interpolation value calculator 4 calculates the respective interpolation values of X and Y axes coordinates of a displayed image in response to the synchronous signal HSI and outputs the interpolation value of the calculated bits (e+f) to the adders 42 and 44.

The jitter correcting apparatus 10 shown in FIG. 3 further comprises a truncation amount detector 40, a selection signal generator 60, a bit converter 22, and an integer corrector 14, in order to correct the jitter component of the horizontal synchronous signal HD' due to the truncation error.

Here, the first phase difference detector 18 further comprises a bit converter 22 between the first DLL 20 and the first latch 24 in order to make the number of bits N of the first phase difference equal to the number of bits P output from the adder 44 of the truncation amount detector 40. Therefore, after the step 200, the bit converter 22 converts the data of N bits output from the first DLL 20 into data of P (where P<N) bits and outputs the converted data of P bits to the first latch 24 (step 202). The operation of the first latch 24 is as described above. Namely, after step 202, step 204 is performed. Here, the bit converter 22 can be realized as an encoder.

After step 204, the truncation amount detector 40 detects the addition of the truncation amount of the interpolation value to the truncation amount of second phase difference, i.e., the addition of the d bits to the f bits, and outputs the detected truncation amount of P bits to the selection signal generator 60 (steps 206 and 208). To achieve this, the first adder 42 adds the upper bits c of the second phase difference to the upper bits e of the interpolation value and outputs the addition result to the horizontal driving signal generator 6 (step 206). The horizontal driving signal generator 6 compares the addition result obtained by the first adder 42 with a predetermined value counted thereby and outputs the horizontal driving signal HD' corresponding to the comparison result. Namely, the horizontal driving signal generator 6 delays the horizontal driving signal HD' by $(2^{c-1}+2^{e-1})*T$ and outputs the delayed horizontal driving signal HD'. Therefore, it is possible to determined the number of upper bits c and e so that the horizontal driving signal HD' can be delayed by a desired time. After step 206, the second adder 44 adds the lower bits d of the second phase difference to the lower bits f of the interpolation value and outputs the addition result to the selection signal generator 60 as the detected truncation amount of P bits (step 208).

Figure 6:
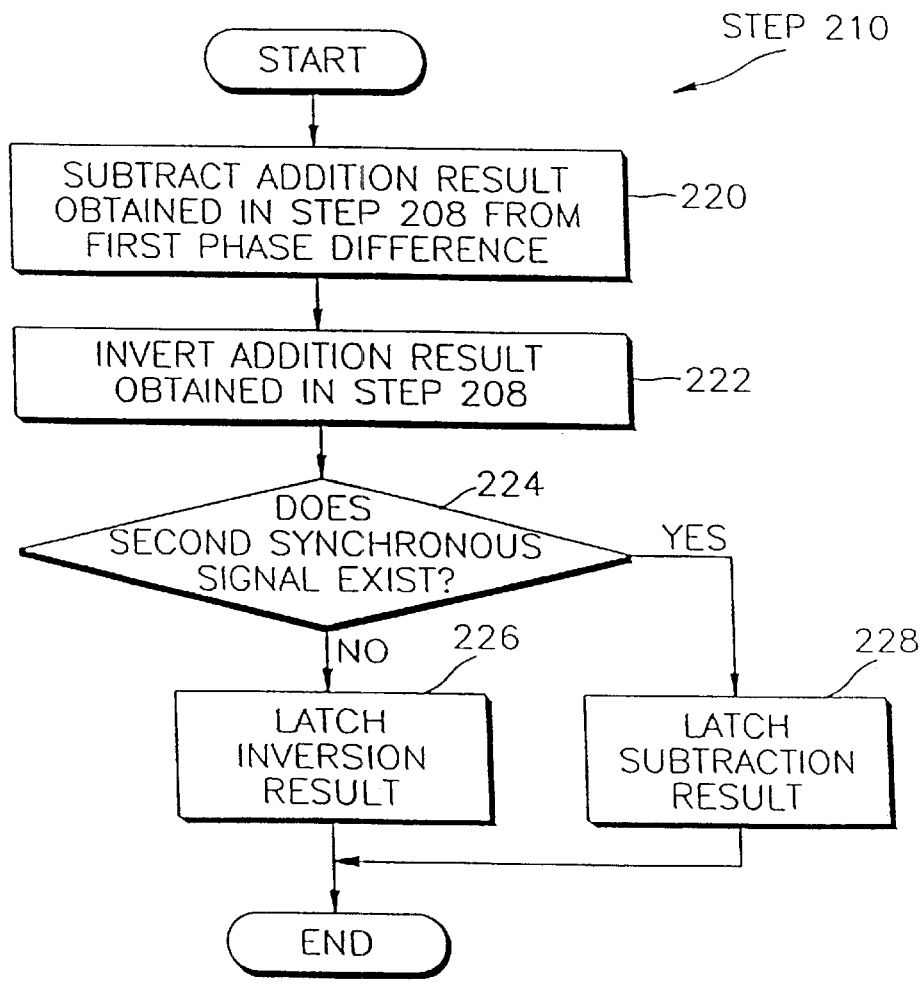
FIG. 6 is a detailed flowchart which illustrates step 210 of the present invention.

FIG. 6 is a flowchart according to the present invention for describing one embodiment of step 210 shown in FIG. 4, which comprises steps 220 through 228 for generating first and second selection signals according to the presence of the second synchronous signal HSI2. After the step 208, the selection signal generator 60 generates first and second selection signals S1 and S2 which are respectively a bits and b bits in size using the truncation amount of P bits detected by the truncation amount detector 40 and the first phase difference of P bits detected by the first phase difference detector 18 (step 210). To achieve this, after step 208, a subtracter 62 of the selection signal generator 60 subtracts the addition result of P bits output from the second adder 44 from the first phase difference of P bits detected by the first phase difference detector 18 and outputs the subtraction result to a first input terminal 0 of a multiplexer 66 (step 220). After step 220, an inverter 64 inverts the addition result obtained by the second adder 44 and outputs the inversion result to a second input terminal 1 of the multiplexer 66 (step 222). After step 222, the controller 8 determines whether the second synchronous signal HSI2 exists (step 224). That is, the controller 8 generates a third selection signal S3 as a "low" logic level when the second synchronous signal HSI2 exists and generates the third selection signal S3 as a "high" logic level when the second synchronous signal HS12 does not exist.

Therefore, when the second synchronous signal HSI2 does not exist, the multiplexer 66 selects the inversion result obtained by the inverter 64 in response to the third selection signal S3 of the "high" logic level and a fourth latch 68 latches the result selected by the multiplexer 66 in response to the second latch signal HSI12 shown in waveform (d) of FIG. 5, output from the controller 8 (step 226).

However, when the second synchronous signal HSI2 exists, the multiplexer 66 selects the subtraction result obtained by the subtracter 62 in response to the third selection signal S3 of the "low" logic level and the fourth latch 68 latches the result selected by the multiplexer 66 in response to the second latch signal HSI12 output from the controller 8 (step 228). At this time, the controller 8 delays the first latch signal HSI11 shown in waveform (c) of FIG. 5 for the unit period T of the system clock signal CLK shown in waveform (a) of FIG. 5 and outputs the delayed result as the second latch signal HSI12 shown in waveform (d) of FIG. 5.

Here, the upper bits a of the bits (a+b) latched by the fourth latch 68 are output to the multiplexer 34 as the first selection signal S1 and the lower bits b are output to the multiplexer 38 as the second selection signal S2. Therefore, it is noted that the decimal number corrector 16 of the jitter corrector 12 corrects the decimal number part of the jitter component included in the horizontal driving signal HD' in response to the second selection signal S2 of b bits instead of the lower bits of the first phase difference detected by the first phase difference detector 18.

The decimal number part of the second phase difference output from the second phase difference detector 2 is less than 1 T. The decimal number part of the interpolation value output from the interpolation value calculator 4 is also less than 1 T. The maximum value of the first phase difference output from the first phase difference detector 18 is also less than 1 T. Therefore, the jitter amount of the horizontal driving signal HD' is between 0 and 3 T. In order to correct the jitter amount, the jitter corrector 12 further comprises an integer corrector 14.

The structure of the integer corrector 14 will now be described. A second latch 30 latches the horizontal driving signal HD' in response to the system clock signal CLK and outputs the latched result to a third latch 32 and the second input terminal 1 of the multiplexer 34. The third latch 32 latches the result latched by the second latch 30 in response to the system clock signal CLK and outputs the latch result to the third input terminal 2 of the multiplexer 34. The multiplexer 34 selects one from the horizontal driving signal HD' input to the first input terminal 0 and signals latched by the second and third latches 30 and 32 in response to the first selection signal S1 of 'a' bits which are the upper bits of the value output from the fourth latch 68, and outputs the selection result to the decimal number corrector 16.

The operation of the integer corrector 14 will now be described. After the step 210, the integer corrector 14 corrects the integer part of the jitter component included in the horizontal driving signal HD' in response to the first selection signal S1 of 'a' bits and outputs the correction result to the decimal number corrector 16 (step 212). After step 212, the above-mentioned step 214 is performed.

Figure 7:
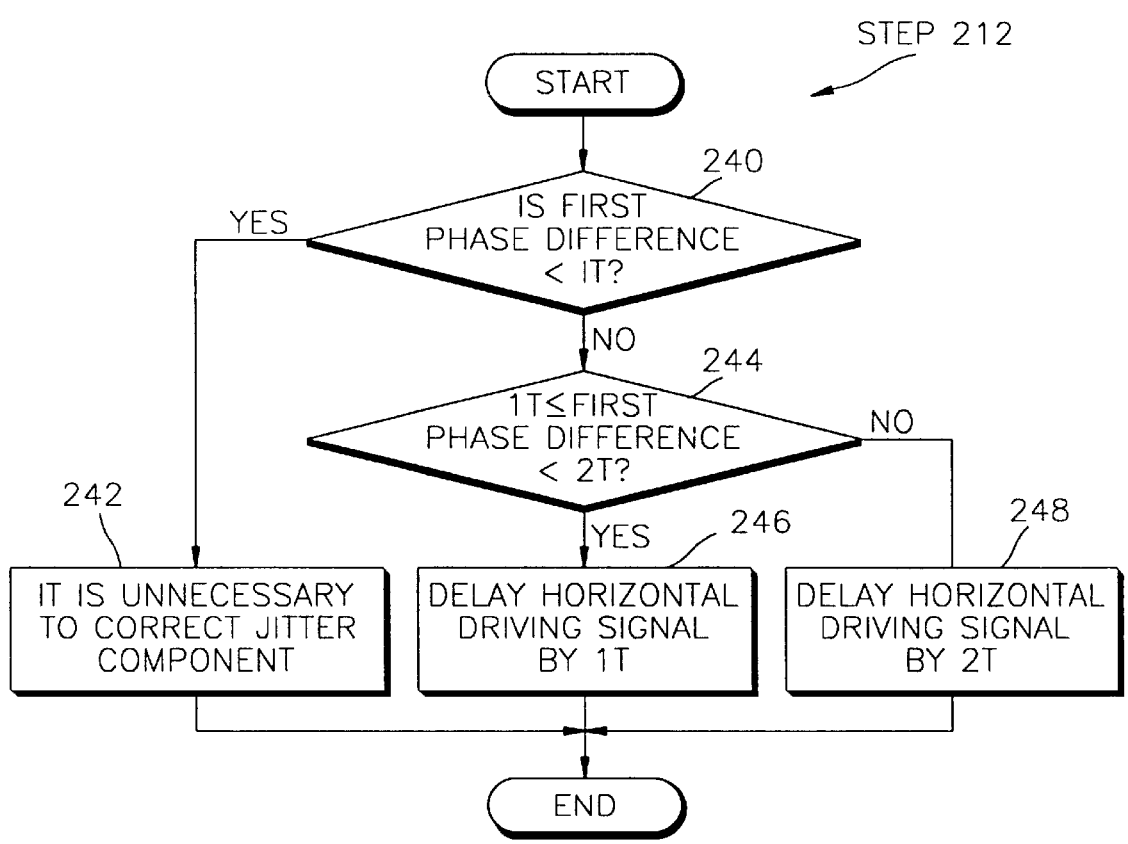
FIG. 7 is a detailed flowchart which illustrates step 212 of FIG. 4, in accordance with one embodiment of the present invention.

Hereinafter, step 212 shown in FIG. 4 will be described in detail. FIG. 7 is a detailed flowchart according to the present invention, for describing step 212 shown in FIG. 4, which comprises the steps of correcting the integer part of the jitter component according to the magnitude of the first phase difference (step 240 to 248). Referring to FIG. 7, the integer corrector 14 shown in FIG. 3 determines whether the first phase difference is less than 1 T using the upper bits 'a' of the first phase difference (step 240). When the first phase difference is less than 1 T, the horizontal driving signal HD' generated by the horizontal driving signal generator 6 is determined as the horizontal driving signal the integer part of the jitter component of which is corrected (step 242). That is, when the first phase difference is less than 1 T, since it is not necessary to correct the integer part of the jitter component of the horizontal driving signal HD', the horizontal driving signal HD' is directly output to the decimal number corrector 16. The steps 240 and 242 are realized by the multiplexer 34 selecting the horizontal driving signal HD' in response to the first selection signal S1.

However, when the first phase difference is not less than 1 T, it is determined whether the first phase difference is not less than 1 T and less than 2 T using the upper bits 'a' of the first phase difference (step 244). When the first phase difference is not less than 1 T and less than 2 T, the horizontal driving signal HD' delayed by T is determined as the horizontal driving signal the integer part of the jitter component of which is corrected (step 246). Steps 244 and 246 are realized by the multiplexer 34 selecting the horizontal driving signal HD' delayed by the second latch 30 by 1 T in response to the first selection signal S1.

Also, when the first phase difference is determined to be no less than 2 T and less than 3 T, the horizontal driving signal HD' delayed by 2 T is determined as the horizontal driving signal the integer part of the jitter component of which is corrected (step 248). Steps 244 and 248 are realized by the multiplexer 34 selecting the horizontal driving signal HD' delayed by the third latch 34 by 2 T in response to the first select signal S1. For example, in the television system shown in FIG. 1, when the jitter component included in the horizontal driving signal HD' is 2.5 T, that is, when the integer part of the jitter component is 2 T and the decimal number part is 0.5 T, the integer corrector 14 and the decimal number corrector 16 correct 2.5 T by operating as mentioned above.

The first DLL 20 and the second DLL 36 divide the unit period T of the system clock signal CLK into N sections. However, it is possible that the first DLL 20 and the second DLL 36 respectively divide the unit period of the system clock signal CLK into different numbers of sections. For example, it is possible that the first DLL 20 divides the unit period into 16 sections and that the second DLL 36 divides the unit period into 32 sections. However, as shown in FIG. 3, it is preferable that the first and second DLLs 20 and 36 respectively divide the unit period into the same number of sections.

Also, in the jitter correcting method according to the present invention shown in FIG. 4, it is possible to simultaneously perform steps 200 to 204 and the steps 206 and 208. That is, it is possible to simultaneously obtain the first phase difference and the truncation amount of P bits.

As mentioned above, according to the apparatus for correcting the jitter of the television system according to the present invention and the method therefor, it is possible to improve picture quality by removing jitter in the displayed image by correcting the jitter component by the synchronous signal HSI2 asynchronized with the system clock signal CLK, as well as the truncation error.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. An apparatus for correcting jitter of a television system having a horizontal driving signal generator that generates a horizontal driving signal in response to a system clock signal and a first synchronous signal, comprising:
    a first phase difference detecting portion that detects a first phase difference between the system clock signal and a second synchronous signal, the second synchronous signal being (i) externally input to the television system, (ii) asynchronous with the system clock signal, and (iii) able to be set as the first synchronous signal; and
    a jitter correcting portion that corrects a jitter component included in the horizontal driving signal in response to the first phase difference and outputting a horizontal driving signal the jitter component of which is corrected.

2. The apparatus of claim 1, wherein the second synchronous signal is output from a computer.

3. The apparatus of claim 1, wherein the first phase difference detecting portion comprises:
    a first delay locked loop (DLL) for dividing a unit period T of the system clock signal into N sections, detecting a section to which the second synchronous signal is input among the sections divided into N, and outputting data of N bits corresponding to the detected section; and
    a first latch for latching the data of N bits output from the first DLL in response to a first latch signal and outputting the latched data as the first phase difference, wherein the first latch signal is generated in response to the second synchronous signal.

4. The apparatus of claim 1, wherein the jitter correcting portion comprises:
    an integer correcting portion for correcting an integer part of a jitter component included in the horizontal driving signal in response to upper bits of the first phase difference and outputting the correction result; and
    a decimal number correcting portion for correcting a decimal number part of the jitter component included in the correction result obtained by the integer corrector in response to lower bits of the first phase difference and outputting the correction result as a horizontal driving signal the jitter component of which is corrected.

5. The apparatus of claim 4, wherein the integer correcting portion comprises:
   a second latch for latching the horizontal driving signal in response to the system clock signal;
   a third latch for latching a signal latched by the second latch in response to the system clock signal; and
   a first selecting portion for selecting one from the group consisting of the horizontal driving signal and signals which are latched by the second and third latches, in response to the upper bits of the first phase difference and outputting the selected signal as the correction result obtained by the integer correcting portion.

6. The apparatus of claim 4, wherein the decimal number correcting portion comprises:
   a second DLL for dividing the unit period of the system clock signal into N sections, detecting from among the sections divided into N, a section to which the correction result obtained by the integer correcting portion is input, and outputting a value corresponding to the detected section; and
   a second selecting portion for selecting one among the N bits output from the second DLL in response to the lower bits of the first phase difference and outputting the selected bit as the correction result obtained by the decimal number correcting portion.

7. The apparatus of claim 4, wherein an apparatus for correcting jitter of a television system having a second phase difference detecting portion for detecting a second phase difference between the horizontal driving signal the jitter component of which is corrected and a fly back pulse and an interpolation value calculator for calculating interpolation values of X and Y coordinates of a displayed image in response to the first synchronizing signal further comprises:
   a truncation amount detecting portion for detecting the truncation amounts of the second phase difference and the interpolation value and outputting the detected truncation amount of P bits; and
   a selection signal generating portion for generating the first and second selection signals using the detected truncation amount and the first phase difference,
   wherein the jitter correcting portion corrects the integer part and the decimal number part of the jitter component included in the horizontal driving signal in response to the first and second selection signals rather than the upper bits and the lower bits of the first phase difference.

8. The apparatus of claim 5, wherein the first phase difference detecting portion further comprises a bit converter for converting the data of N bits output from the first DLL into data of P bits and outputting the converted data to the first latch,
   wherein the first latch latches the data of P bits output from the bit converting portion in response to the first latch signal and outputs the latched data as the first phase difference.

9. A method for correcting jitter of a television system performed by a jitter correcting apparatus of the television system having a horizontal driving signal generator that generates a horizontal driving signal in response to a system clock signal and a first synchronous signal, comprising the steps of:
   (a) detecting a first phase difference between a second synchronous signal and the system clock signal the second synchronous signal being asynchronous with the system clock signal and able to be set as the first synchronous signal; and
   (b) correcting the jitter component included in the horizontal driving signal, corresponding to the first phase difference.

10. The method of claim 9, wherein the second synchronous signal is generated by a computer.

11. The method of claim 9, wherein step (a) comprises the steps of:
   (a1) dividing the unit period T of the system clock signal into N sections, detecting, from among the sections divided into N, a section to which the second synchronous signal is input, and obtaining data of N bits corresponding to the detected section; and
   (a2) latching the data of N bits corresponding to a first latch signal, wherein the first latch signal is generated corresponding to the second synchronous signal and the data latched in step (a2) corresponds to the first phase difference.

12. The method of claim 9, wherein step (b) comprises the steps of:
   (b1) correcting the integer part of the jitter component included in the horizontal driving signal, corresponding to the upper bits of the first phase difference; and
   (b2) correcting the decimal number part of the jitter component included in the horizontal driving signal corrected in step (b1), corresponding to the lower bits of the first phase difference.

13. The method of claim 12, wherein step (b1) comprises the steps of:
   (b11) determining whether the first phase difference is less than the unit period T of the system clock signal using the upper bits of the first phase difference;
   (b12) determining the horizontal driving signal generated by the horizontal driving signal generator as the horizontal driving signal corrected in step (b1), when the first phase difference is less than 1 T;
   (b13) determining whether the first phase difference is less than 2 T using the upper bits of the first phase difference when the first phase difference is not less than 1 T;
   (b14) delaying the horizontal driving signal generated by the horizontal driving signal generator by 1 T and determining the delay result as the horizontal driving signal corrected in step (b1), when the first phase difference is less than 2 T; and
   (b15) delaying the horizontal driving signal by 2 T and determining the delayed result as the horizontal driving signal corrected in step (b1), when the first phase difference is determined to be not less than 2 T in step (b13).

14. The method of claim 12, wherein the step (b2) comprises the steps of:
   (b21) dividing the unit period of the system clock signal into N sections, detecting a section to which the horizontal driving signal corrected in step (b1) is input among the sections divided into N, and obtaining data of N bits corresponding to the detected section; and
   (b22) selecting a corresponding bit among the N bits of the data obtained in step (b21) using the lower bits of the first phase difference and determining the selected bit as the horizontal synchronizing signal corrected in step (b2).

15. The method of claim 12, wherein a method for correcting jitter of the television system having a phase difference detecting portion for detecting a second phase difference between the horizontal driving signal the jitter component of which is corrected and a fly back pulse and an interpolation value calculating portion for calculating interpolation values of X and Y axes coordinates of a displayed image in response to the first synchronous signal comprises the steps of:

(c) detecting the truncation amounts of the interpolation value and the second phase difference after the step (a); and (d) generating first and second selecting signals using the truncation amount of P bits detected in the step (c) and the first phase difference, and proceeding to the step (b), wherein, in the step (b), the integer part and the decimal number part of the jitter component of the horizontal driving signal are respectively corrected in response to the first and second selection signals rather than the upper and lower bits of the first phase difference.

16. The method of claim 11, wherein step (a) further comprises the step (a3) of converting the data of N bits into data of P bits after step (a1), and wherein the data of P bits converted in step (a3) is latched corresponding to the first latch signal in step (a2).

* * * * *